United States Patent
Marlow et al.

(10) Patent No.: US 9,536,138 B2
(45) Date of Patent: Jan. 3, 2017

(54) DYNAMIC REMAPPING OF COMPONENTS OF A VIRTUAL SKELETON

(71) Applicant: Microsoft Technology Licensing, LLC, Redmond, WA (US)

(72) Inventors: Christopher Richard Marlow, Hinckley (GB); Eike Jens Umlauf, Tamworth (GB); Andrew John Preston, Market Bosworth (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 14/318,263

(22) Filed: Jun. 27, 2014

(65) Prior Publication Data

US 2015/0379335 A1 Dec. 31, 2015

(51) Int. Cl.

| G06K 9/00 | (2006.01) |
|---|---|
| G06F 3/01 | (2006.01) |
| G06K 9/44 | (2006.01) |
| G06T 7/00 | (2006.01) |
| G06T 7/20 | (2006.01) |
| A63F 13/428 | (2014.01) |
| A63F 13/213 | (2014.01) |

(52) U.S. Cl.
CPC ......... *G06K 9/00369* (2013.01); *A63F 13/213* (2014.09); *A63F 13/428* (2014.09); *G06F 3/011* (2013.01); *G06K 9/44* (2013.01); *G06T 7/0046* (2013.01); *G06T 7/2046* (2013.01); *G06T 2207/30196* (2013.01)

(58) Field of Classification Search
None
See application file for complete search history.

(56) References Cited

U.S. PATENT DOCUMENTS

| 6,317,132 B1 | 11/2001 | Perlin |
|---|---|---|
| 6,697,072 B2 | 2/2004 | Russell et al. |
| 7,478,047 B2 | 1/2009 | Loyall et al. |
| 2004/0155962 A1 | 8/2004 | Marks |

(Continued)

OTHER PUBLICATIONS

Azimi, "Skeletal Joint Smoothing White Paper", Published on. Jul. 14, 2012, Available at: http://msdn.microsoft.com/en-us/library/jj131429.aspx, 28 Pp.

*Primary Examiner* — Said Broome
(74) *Attorney, Agent, or Firm* — Judy Yee; Micky Minhas; Lee & Hayes PLLC

(57) ABSTRACT

Technologies are described herein for dynamically remapping components of a virtual skeleton to enhance the control and appearance of an avatar. Embodiments disclosed herein may remap components of the virtual skeleton if a need for an enhancement, replacement or correction is identified. For example, one or more components of a virtual skeleton, e.g., a joint, hand, arm or leg, may be remapped with modeled components if the component is distorted, missing or incomplete. Components of a virtual skeleton may be remapped with modeled components if enhancements, augmentations, corrections or special effects are desired. A remapped skeleton defining one or more modeled components may be generated from model data. The remapped skeleton may be used to drive user-controlled animations having enhanced movement and appearance characteristics. In addition to driving user-controlled animations, the remapped skeleton may be used to drive robotic devices.

18 Claims, 10 Drawing Sheets

(56) References Cited

U.S. PATENT DOCUMENTS

| | | |
|---|---|---|
| 2005/0215319 A1 | 9/2005 | Rigopulos et al. |
| 2010/0203968 A1 | 8/2010 | Gill et al. |
| 2010/0295771 A1 | 11/2010 | Burton et al. |
| 2010/0302253 A1 | 12/2010 | Kipman et al. |
| 2012/0306924 A1* | 12/2012 | Willoughby ............ A63F 13/10 |
| | | 345/641 |

* cited by examiner

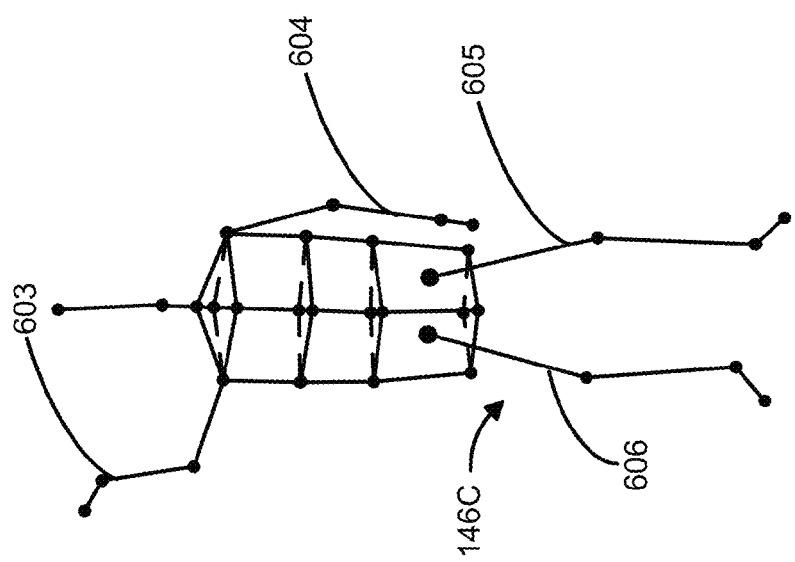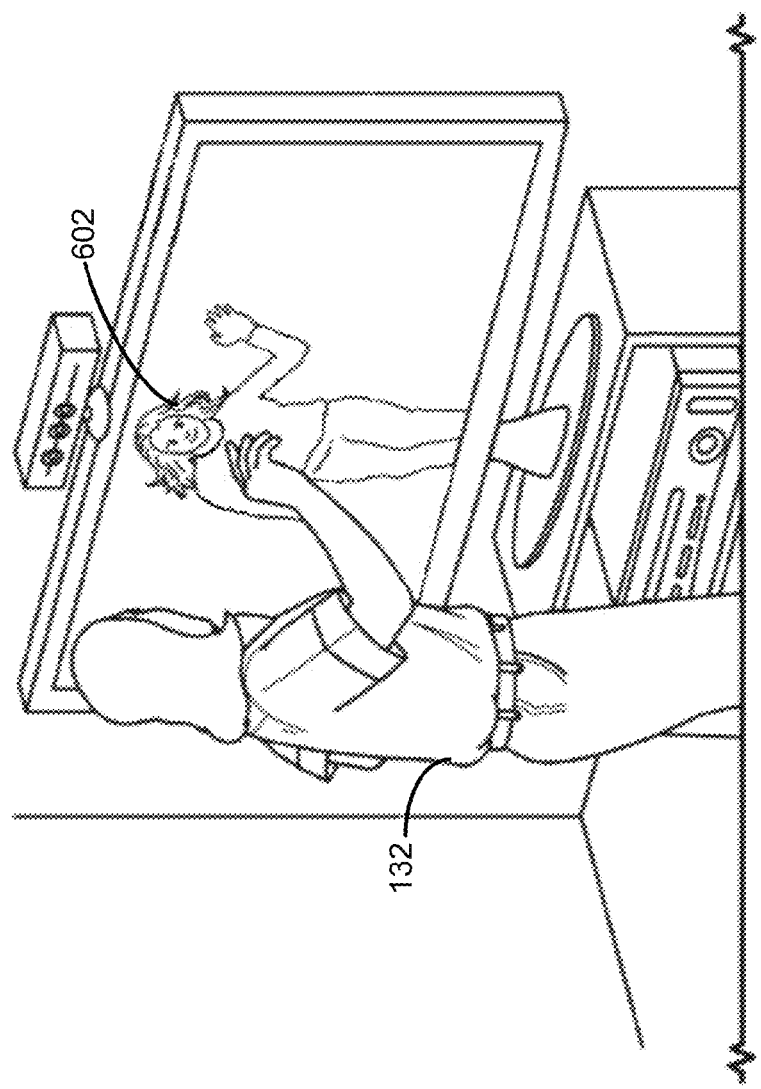
FIGURE 6

DYNAMIC REMAPPING OF COMPONENTS OF A VIRTUAL SKELETON

BACKGROUND

Some computer applications, such as computer games and multimedia applications, use controllers, remotes, keyboards, mice, or other input devices that allow users to manipulate game characters or other aspects of the application. More recently, some computer games and multimedia applications have begun employing cameras and software gesture recognition engines to provide a natural user interface ("NUI"). A NUI may permit user gestures to be detected, interpreted and used to control game characters or other aspects of an application or platform.

In some situations, a NUI system may find it challenging to distinguish a person in the field of view of an image sensor from other objects. It might also be difficult for a NUI system to correctly identify the positions of certain body parts. Some existing mechanisms are known for tracking a user's arms or legs. However, given the wide variety of possible positions and gestures, some conventional systems do not efficiently track a user's body parts when the user moves quickly or moves out of the field of view. For instance, when a user is expressing a gesture that resembles the action of throwing a ball, the throwing arm may disappear behind the user's body during the windup portion of the gesture. In addition, image data captured during the throw may not be reliable if the user's hand moves at a high velocity. Such drawbacks may lead to a less than desirable user experience.

It is with respect to these and other considerations that the disclosure made herein is presented.

SUMMARY

Technologies are described herein for dynamically remapping components of a virtual skeleton to enhance the control and appearance of an avatar. Embodiments disclosed herein may remap components of the virtual skeleton if a need for an enhancement, replacement or correction is identified. For example, a component of the virtual skeleton, e.g., a joint, hand, arm or leg, may be remapped with a modeled component if the component of the virtual skeleton is distorted, missing or incomplete. Components of a virtual skeleton may also be remapped with one or more modeled components if enhancements, augmentations, corrections or special effects are desired.

A remapped skeleton defining one or more modeled components may be generated from model data. The remapped skeleton may be used to drive user-controlled animations having enhanced movement and/or appearance characteristics. In addition to driving user-controlled animations, the remapped skeleton may be used to drive robotic devices.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 is a pictorial diagram showing an image analysis system and a virtual skeleton generated by the image analysis system;

DETAILED DESCRIPTION

Figure 1:
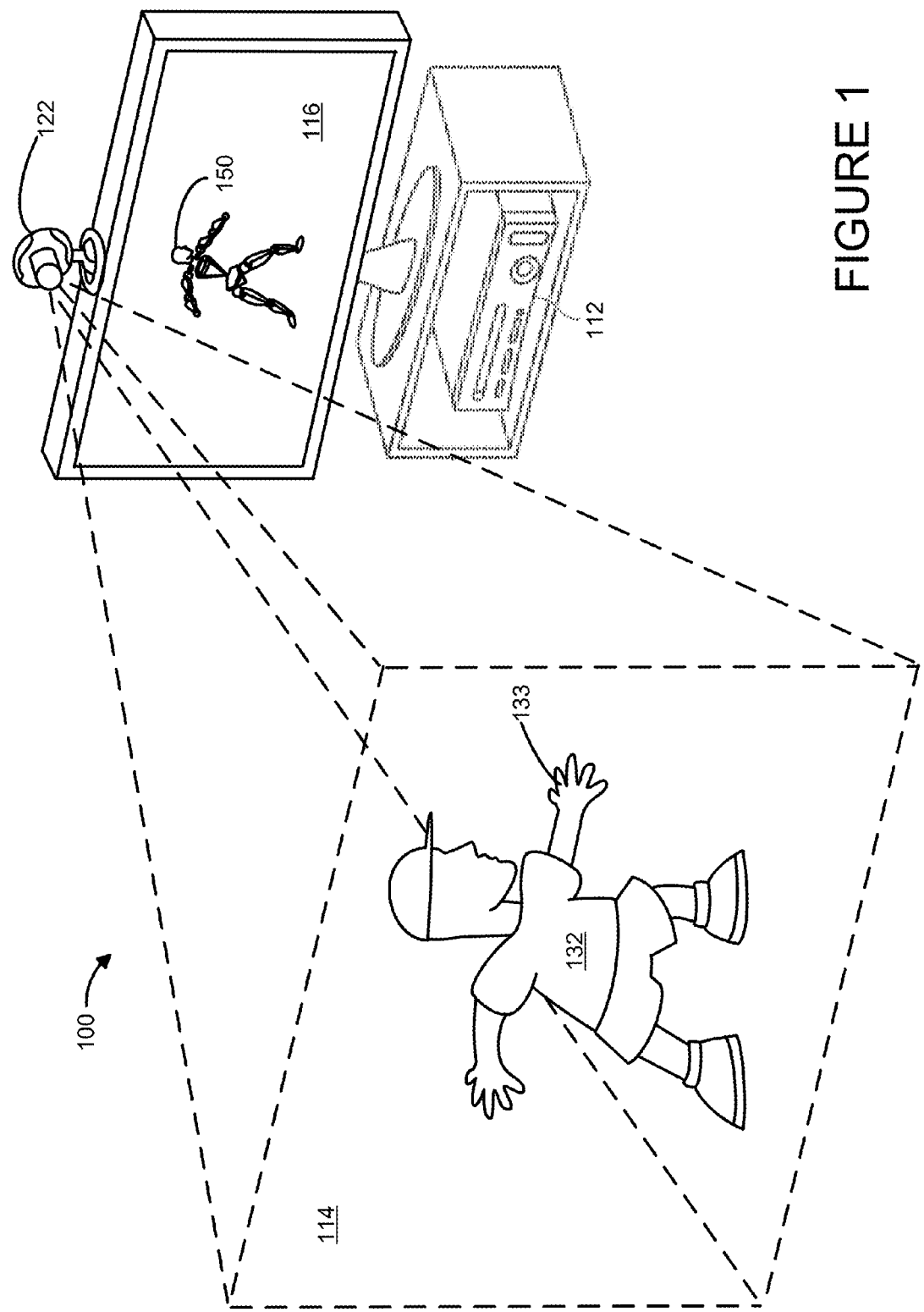
FIG. 1 is a pictorial diagram showing an image analysis system being utilized to view an example observed scene.

Technologies are described herein for dynamically remapping components of a virtual skeleton to enhance the control and appearance of an avatar. Embodiments disclosed herein may remap components of a virtual skeleton if a need for an enhancement, replacement or correction is identified. For example, a component of the virtual skeleton, e.g., a joint, hand, arm or leg, may be remapped with a modeled component if the component of the virtual skeleton is distorted, missing or incomplete. Components of a virtual skeleton may also be remapped with one or more modeled components if enhancements, augmentations, corrections or special effects are desired.

A remapped skeleton defining one or more modeled components may be generated from model data. The remapped skeleton may be used to drive user-controlled animations having enhanced movement and appearance characteristics. In addition to driving user-controlled animations, the remapped skeleton may be used to drive robotic devices.

In aspects disclosed herein, a computing device and a camera may be configured to capture input images of a human target. The input images may be used to generate input data defining a virtual skeleton. Techniques described herein identify one or more components of the virtual skeleton (also referred to herein as "skeletal components") to be remapped based on a need for an enhancement, replacement or correction. The identified components are then replaced, enhanced or augmented with modeled components to produce a remapped skeleton that may be aligned with a scenario presented in a virtual environment.

In one aspect, techniques described herein involve the use of pre-recorded data captured from a model, such as a professional athlete. In such an embodiment, the model data may define the model's body proportions, posture, etc. The model data may also include parameters defining the model's movement characteristics and form. As will be described in more detail below, the model data may be combined with input data to generate a remapped skeleton that may include body proportions and movement characteristics of the model, e.g., the professional athlete. By generating a remapped skeleton that is based on input data and model data, the user may control an avatar with improved on-screen characteristics, such as an improved posture, form, pose, etc.

In another aspect, techniques described herein involve removing, resolving or mitigating conflicts involving one or more components of a virtual skeleton. Generally described, a conflict may be identified if there is a collision between a skeletal component and another skeletal component or object of a virtual environment. A conflict, for example, may be identified if two components occupy the same virtual space at a given moment in time.

The techniques described herein may be used to correct conflicts within the virtual environment by remapping select components of the virtual skeleton. In one illustrative example, if a virtual skeleton is positioned next to a virtual wall, and an arm of the virtual skeleton is positioned such that the arm protrudes through the wall, a conflict may be identified. Techniques described herein may correct the conflict by generating a remapped skeleton defining another position for the arm that does not conflict with the wall.

In other aspects, techniques described herein involve the use of model data that defines fictitious or augmented characteristics. For example, the model data may include parameters that enable a computing device to generate a remapped skeleton defining a creature with four arms. In another example, the model data may include parameters that enable a computing device to generate a remapped skeleton defining special movement characteristics, such as super-human jumping, stretching, etc.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system and methodology for dynamically remapping virtual skeleton data will be described.

Figure 2:
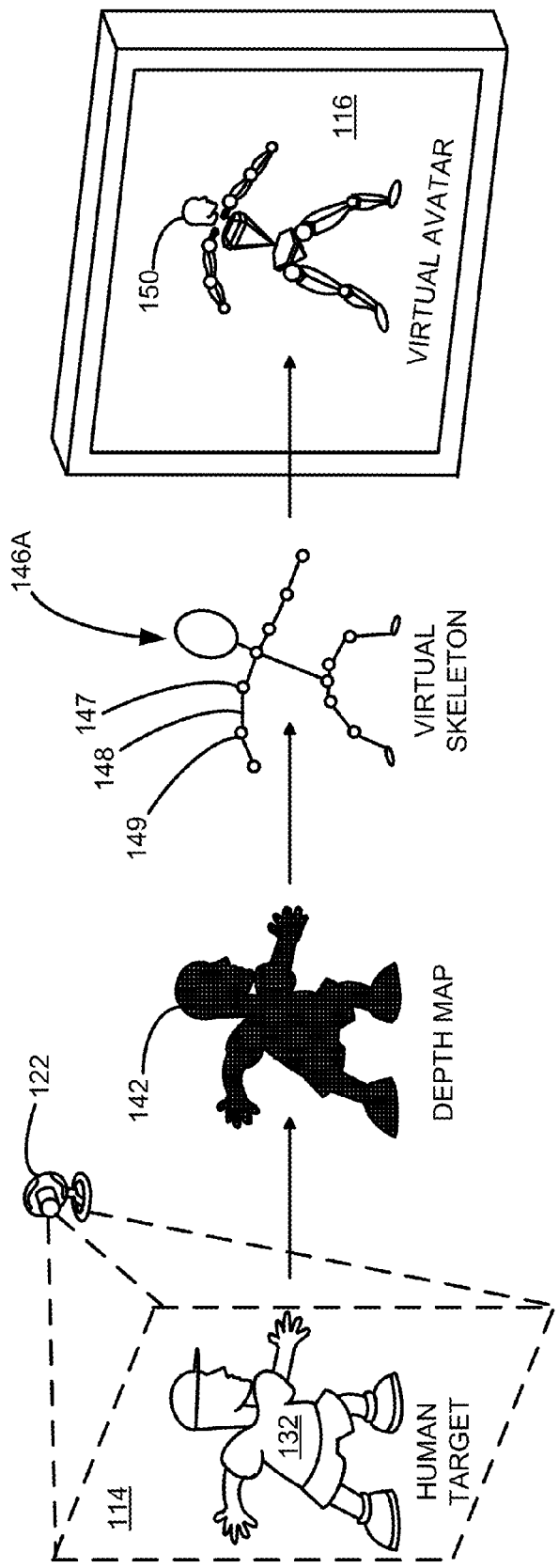
FIG. 2 is a pictorial diagram illustrating aspects of the modeling of a human target with a virtual skeleton and an avatar.

Turning now to FIGS. 1 and 2, details will be provided regarding an illustrative operating environment and several software components provided by the embodiments presented herein. An image analysis system 100 may include a gaming system 112 and a camera 122 capable of observing one or more players. For illustrative purposes, a player is also referred to herein as a "human target 132." As the camera 122 captures images of a human target 132 within an observed scene 114, those images may be interpreted by the gaming system 112 and modeled as one or more virtual skeletons 146A. The relative position of a hand joint or other point of interest of the virtual skeleton 146A may be translated as a gestured control. As described in more detail below, the camera 122 may capture images of the human target 132 performing gestures to control an avatar 150.

FIG. 1 shows a non-limiting example of the image analysis system 100. In particular, FIG. 1 shows a gaming system 112 that may be used to play a variety of different games, play one or more different media types, and/or control or manipulate non-game applications and/or operating systems. FIG. 1 also shows a display device 116 such as a television or a computer monitor, which may be used to present game visuals to game players. As one example, display device 116 may be used to visually present an avatar 150, which the human target 132 may control with his or her movements. The image analysis system 100 may include a capture device connected to the gaming system 112, such as the camera 122, which may visually monitor or track the human target 132 within an observed scene 114.

The human target 132 is shown in FIG. 1 as a game player within an observed scene 114. The human target 132 may be tracked by the camera 122 so that the movements of the human target 132 may be interpreted by the gaming system 112 as controls that can be used to affect the game or application being executed by the gaming system 112. In other words, the human target 132 may use his or her movements to control a game or other type of application. The movements of the human target 132 may be interpreted as virtually any type of game control. Some movements of the human target 132 may also be interpreted as controls that serve purposes other than controlling the avatar 150. As non-limiting examples, movements of the human target 132 may be interpreted as controls that steer a virtual racing car, throw a virtual baseball, climb a virtual wall, or manipulate various aspects of a simulated world. Movements of the human target 132 may also be interpreted as auxiliary management controls. For example, the human target 132 may use movements to end, pause, save, select a level, view high scores, communicate with other players, change setup options, change the zoom or orientation of a display, manipulate a presentation application, or manipulate a database/spreadsheet application, etc.

The camera 122 may also be used to interpret movements for operating system and/or application controls that are outside the realm of gaming. Virtually any controllable aspect of an operating system and/or an application may be controlled by movements of the human target 132. The illustrated scenario in FIG. 1 is provided as an example, but is not meant to be limiting in any way. To the contrary, the illustrated scenario is intended to demonstrate a general concept, which may be applied to a variety of different applications without departing from the scope of this disclosure.

The methods and processes described herein may be used on a variety of different types of computing systems. FIG. 1 shows a non-limiting example that includes the gaming system 112, display device 116, and camera 122. As can be appreciated, although the example of FIG. 1 includes the gaming system 112, the image analysis system 100 may also include a general computing device.

FIG. 2 shows a simplified processing pipeline in which the human target 132 in the observed scene 114 is modeled as a virtual skeleton 146A that can be used to draw an avatar 150 on display device 116 and/or serve as a control input for controlling other aspects of a game, application, and/or operating system. It will be appreciated that a processing pipeline may include additional steps and/or alternative steps than those depicted in FIG. 2 without departing from the scope of this disclosure.

As shown in FIG. 2, the human target 132 and the remainder of the observed scene 114 might be imaged by a capture device, such as the camera 122. The camera 122 may determine, for each pixel, the depth of a surface in the observed scene 114 relative to the camera 122. Virtually any depth finding technology may be used without departing from the scope of this disclosure. For example, infrared, radio or light signals can be used to measure the distance between the camera 122 and a surface in the observed scene 114. Such as measured distance may be stored as a depth value.

A depth map 142 may be used to store a depth value for each pixel of a captured image. Such a depth map 142 may take the form of virtually any suitable data structure, including but not limited to a matrix that includes a depth value for each pixel of the observed scene. As can be appreciated, a depth value may indicate a distance between the camera 122 and an object represented by any given pixel.

In FIG. 2, the depth map 142 is illustrated as a pixelated grid of the silhouette of the human target 132. This illustration is for simplicity of understanding, not technical accuracy. It is to be understood that a depth map 142 generally includes a depth value for all pixels, not just pixels that image the human target 132, and that the perspective of camera 122 would not result in the silhouette depicted in FIG. 2.

The virtual skeleton 146A may be derived from the depth map 142 to provide a machine-readable representation of the human target 132. In other words, the virtual skeleton 146A is derived from the depth map 142 to model the human target 132. The virtual skeleton 146A may be derived from the depth map 142 in any suitable manner. In some embodiments, one or more skeletal fitting algorithms may be applied to the depth map 142. The present disclosure is compatible with virtually any skeletal modeling technique. It is to be understood that input data refers to any type of data, such as image data, depth value and/or other data received from an input device, which can be used to generate a virtual skeleton 146A representing the human target 132.

The virtual skeleton 146A may include a plurality of joints, each joint corresponding to a portion of the human target 132. In FIG. 2, the virtual skeleton 146A is illustrated as a fifteen joint stick figure. This illustration is for simplicity of understanding, not technical accuracy. Virtual skeletons in accordance with the present disclosure may include virtually any number of joints, each of which can be associated with virtually any number of parameters defining parts or components, e.g., three dimensional joint position, joint rotation, etc.

It is to be understood that a virtual skeleton 146A may take the form of a data structure including one or more parameters for each of a plurality of skeletal joints and the connections between each joint. For example, the virtual skeleton 146A may include a shoulder joint 147, an arm 148 and an elbow joint 149. In an example data structure, the virtual skeleton 146A may be a joint matrix including an x position, a y position, a z position, and a rotation for each joint. In some embodiments, other types of virtual skeletons may be used (e.g., a wireframe, a set of shape primitives, etc.).

As can be appreciated, the joints and/or the connections between each joint are referred to herein as a "component" of a virtual skeleton. In the following description, a component of a virtual skeleton may include individual joints, a connection between individual joints, a collection of joints and/or connections between joints that are representative of body parts of a human target. For example, a component may include a collection of joints and connections between joints representing a hand of the human target. In other examples, a component of a virtual skeleton may include a joint, joints and/or a number of connections representative of an arm, an elbow, a leg, a hand, a foot or a combination of such parts.

As shown in FIG. 2, an avatar 150 may be rendered on a display device 116 as a visual representation of the virtual skeleton 146A. Because the virtual skeleton 146A models the human target 132, and the rendering of the avatar 150 is based on the virtual skeleton 146A, the avatar 150 serves as a viewable digital representation of the human target 132. As such, movement of the avatar 150 on the display device 116 reflects the actual movements of the human target 132.

In some embodiments, only portions of an avatar 150 will be presented on the display device 116. As one non-limiting example, the display device 116 may present a first person perspective to the human target 132 and may, therefore, present the portions of the avatar 150 that could be viewed through the virtual eyes of the avatar, e.g., outstretched hands holding a steering wheel, a single outstretched hand throwing a baseball, an outstretched hand touching a virtual wall in a three-dimensional virtual world, etc.

Figure 4:
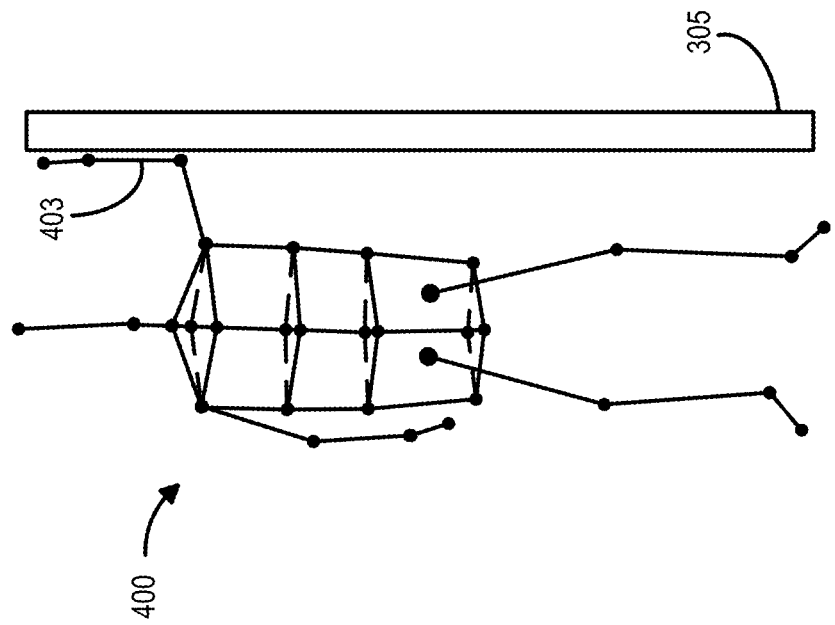
FIG. 4 is a pictorial diagram showing a remapped skeleton that is derived from the virtual skeleton shown in FIG. 3.
Figure 3:
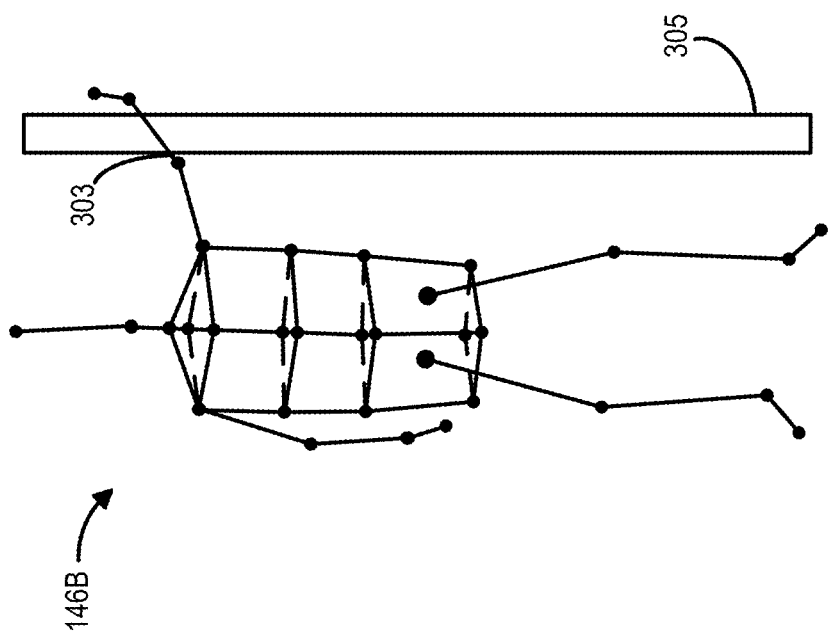
FIG. 3 is a pictorial diagram showing a virtual skeleton modeling input data of an image analysis system.

As summarized above, technologies disclosed herein may remap components of a virtual skeleton 146A if one or more conflicts affecting the components of the virtual skeleton 146A are identified. When such a conflict is identified, a remapped skeleton may be generated to remove, resolve or mitigate the conflicts affecting the components of the virtual skeleton. FIGS. 3 and 4 provide an illustrative example of a conflict affecting components of a virtual skeleton 146B, and a remapped skeleton 400 that is generated to correct the conflict.

FIG. 3 shows an example of a virtual skeleton 146B positioned near a wall 305. In this example, one arm 303 of the virtual skeleton 146B is positioned such that the arm 303 protrudes through the wall 305. As summarized above, techniques disclosed herein identify components of a virtual skeleton that are in conflict with other components or other virtual objects.

In one implementation, a conflict may be identified if objects or components are occupying the same virtual space at a given point in time. FIG. 3 shows one example of a conflict between a component of the virtual skeleton and a virtual object: the arm 303 and the wall 305. As shown, the arm 303 of the virtual skeleton 146B is protruding through the wall 305. Once a component, e.g., the arm 303, has been identified as the component involved in a conflict, a remapped skeleton may be generated to remove, resolve or mitigate the conflict.

FIG. 4 shows one illustrative example of a remapped skeleton 400. In one embodiment, the generation of the remapped skeleton 400 may be based on data defining the virtual skeleton 146B and model data. The model data, for example, may define a new or corrected version of the identified component.

In the example shown in FIGS. 3 and 4, given that the arm 303 was identified as a component involved in a conflict, model data may be generated to define a modeled component, such as a modeled arm 403, that does not conflict with the wall 305. In addition, the data defining the components of the virtual skeleton 146B that are not involved in the conflict may be used to define all other components of the remapped skeleton 400. Using such a combination of the data defining the virtual skeleton 146B and model data may allow a user to control the movement of the remapped skeleton 400, while allowing for a correction or enhancement of one or more components involved in a conflict.

The model data may be generated by the use of a number of techniques. For instance, the model data may define a new position or new characteristics of the one or more identified components involved in a conflict. For example, the model data may define a new position, size or shape of the one or more identified components involved in a conflict. The new position, size, shape or any modified characteristic of the identified components may be arranged in a manner to remove, resolve or mitigate the conflict. As will be described in more detail below, the model data may also include pre-recorded data or custom data defining skeletal components with fictional physical and movement properties.

Figure 5:
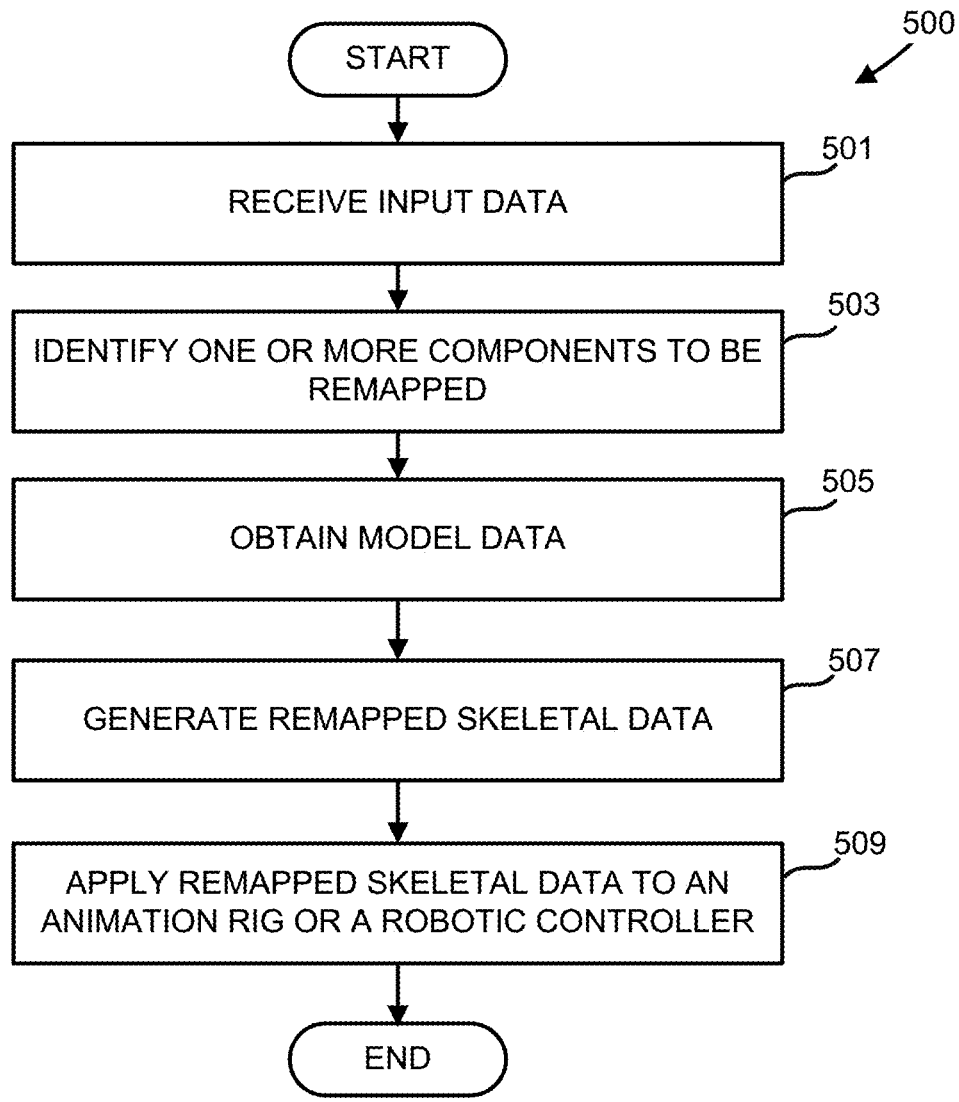
FIG. 5 is a flow diagram illustrating aspects of one illustrative routine for dynamically remapping select components of a virtual skeleton.

Referring now to FIG. 5, a flow diagram showing aspects of one illustrative routine 500 for dynamically remapping select components of a virtual skeleton will be described. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. Thus, it also should be understood that the illustrated methods can be ended at any time and need not be performed in its entirety. These operations may also be performed in a different order than those described herein.

Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

As will be described in more detail below in the description of FIG. 11, the operations of the routine 500 are described herein as being implemented on a computing device 1100, which may be used to implement the gaming device 112 of FIG. 1. The computing device 1100 may execute several software modules for supporting the functions and operations described herein. For example, a skeletal processing module 1128 may access virtual skeleton data 1130 and model data 1132 to generate remapped skeleton data 1131.

Although the following illustration refers to a skeletal processing module executing on a computing device, it can be appreciated that the operations of the routine 500 may be also implemented in many other ways. For example, the routine 500 may be implemented as part of an operating system, a productivity application, or any other application that processes input data. In addition, one or more of the operations of the routine 500 may alternatively or additionally be implemented, at least in part, by an application executing on a remote computer, such as the remote computer 1150 of FIG. 11. These operations might also be implemented in hardware and/or a combination of software and hardware.

The routine 500 begins at operation 501 where the skeletal processing module obtains input data defining a virtual skeleton. As described above with respect to FIGS. 1 and 2, the input data may include any type of information that defines a virtual skeleton representing a human target 132. In addition, the input data may be in any format that is compatible with any skeletal modeling technique. For illustrative purposes, the disclosure herein may refer to "frames" of the input data, where each frame includes data defining a virtual skeleton at a distinct point in time.

Next, at operation 503, the skeletal processing module identifies one or more components of the virtual skeleton to be remapped if there is a need for an enhancement, replacement or correction. As summarized above, a need for an enhancement, replacement or correction may be based on one or more scenarios related to the virtual skeleton. For instance, and as shown in the example of FIG. 3, one or more components of a virtual skeleton may be identified for an enhancement, replacement or correction if there is a conflict affecting one or more components of the virtual skeleton. As described above, FIG. 3 shows one illustrative example where a component, the arm 303 of the virtual skeleton 146B, is in conflict with an object, the wall 305. When such a conflict exists, e.g., when two or more components or objects occupy the same virtual space at a given point in time, the skeletal processing module identifies the components that are affected by the conflict.

Operation 503 may also include other techniques for identifying components of a virtual skeleton to be remapped. For instance, as summarized above, one or more components of the virtual skeleton may also be identified for an enhancement, replacement or correction if a game or application is configured to improve the appearance of a virtual avatar. For example, a game or application may enhance or augment a virtual skeleton with an improved posture or with different body proportions. Illustrative examples showing such enhancements and augmentations to a virtual skeleton are described in more detail below and shown in FIGS. 6, 7 and 10.

Operation 503 may also include other techniques where the identification of components is based on defects associated with the virtual skeleton. For example, one or more components of the virtual skeleton may be identified for an enhancement, replacement or correction if one or more components of the virtual skeleton creates an inconsistency within the virtual skeleton structure, or if the virtual skeleton is distorted or incomplete. For example, if a virtual skeleton that is interpreted from input data is missing an arm, or if the arm is out of proportion with the rest of the body, techniques of operation 503 may identify one or more components of the arm to be remapped. Illustrative examples involving such scenarios are described in more detail below and shown in FIGS. 8 and 9.

With respect to operation 503, it should be appreciated that the identification of one or more components for remapping may include any or all parts of the virtual skeleton. It should also be appreciated that the identification process of operation 503 may be controlled or influenced by a user input, a configuration setting and/or an automated mechanism executing during runtime. For example, an application or a gaming system may be configured to automatically identify specific components of a virtual skeleton for remapping if those specific components are to be augmented to fit a particular game scenario, such as one example including an avatar with four arms. Once one or more components have been identified to be remapped, model data may be used to enhance, replace or correct the identified components.

Next, at operation 505, the skeletal processing module obtains model data to be used to remap the virtual skeleton. As summarized above, a number of techniques for obtaining model data may be used in operation 505, including techniques for generating model data, accessing locally stored model data and/or receiving model data from external resources. For example, and as described above and shown in FIGS. 3 and 4, the skeletal processing module may generate model data that defines a new or corrected version of a component that is identified for remapping.

In applying the example of FIG. 3 to operation 503, given that the arm 303 was identified as a component involved in a conflict, the skeletal processing module may generate model data defining a modeled component, such as the modeled arm 403, which does not conflict with the wall 305. As described above, the model data may define a new position, size, shape or characteristic of the one or more identified components involved in a conflict. The new position, size, shape or any modified characteristic of the identified components may be arranged in a manner to remove, resolve or mitigate the conflict.

In another example involving operation 505, the skeletal processing module may receive or access pre-recorded model data, which may include data captured from professional athletes and/or other human models. As will be described in more detail below, such pre-recorded model data may be used to enhance the form and appearance of an avatar representing the human target. In addition, the pre-recorded model data may be used to resolve issues with respect to missing or distorted components of a virtual skeleton. Examples utilizing pre-recorded skeletal data are described in more detail below and shown in FIGS. 6, 7, 8 and 9.

Operation 505 may also include other techniques for obtaining the model data. For example, the model data may be generated by the skeletal processing module to replace, correct and/or otherwise compensate for missing or distorted skeletal components. For example, if one or more frames of the input data define a virtual skeleton with missing components, such as a missing arm or leg, skeletal parameters from other frames of the input data may be used to provide parameters that define the missing or distorted components. In other techniques disclosed herein, custom or pre-recorded model data may also be used to define modeled components that may be used in frames that may have distorted or missing skeletal components. Illustrative examples involving such scenarios are described in more detail below and shown in FIGS. 8 and 9.

In other examples of operation 505, the obtained model data may also include the use of customized skeletal data that defines skeletal components with fictional physical and movement properties. As can be appreciated, such model data may be pre-recorded or such model data may be generated, at least in part, using one or more remote or local computing devices. Illustrative examples involving model data defining fictional skeletal components are described in more detail below and shown in FIG. 10.

Next, at operation 507, the skeletal processing module generates the remapped skeleton based, at least in part, on the model data. In one technique disclosed herein, the remapped skeleton is generated from a combination of the model data and the input data defining the virtual skeleton. In such techniques, the model data and the input data are combined in a manner that enables the human target to control the movements of the remapped skeleton, and in addition, the remapped skeleton also utilizes the model data to correct and/or enhance the virtual skeleton.

As summarized above, the generation of the remapped skeleton may involve removing, resolving or mitigating conflicts affecting components of a virtual skeleton. Generally described, a conflict may be identified if there is a collision between a component of the virtual skeleton and another component or object of the virtual map. For instance, as described above, a conflict may be identified if two components occupy the same virtual space at the same time. In one aspect, operation 507 may generate a remapped skeleton to remove, resolve or mitigate conflicts affecting components of the virtual skeleton.

Referring again to the example of FIGS. 3 and 4, the arm 303 was identified as a component that was affected by a conflict. In response to identifying the arm 303 as a component affected by the conflict, as described above, the skeletal processing module may generate model data defining a modeled component, the modeled arm 403. In applying the operation 507 to this illustrative example, and as shown in FIG. 4, the skeletal processing module generates a remapped skeleton 400 using a combination of the input data defining the virtual skeleton 146B and the model data defining the modeled arm 403. As shown in FIG. 4, the remapped skeleton 400 includes the modeled arm 403, which includes the new position that is not in conflict with the wall 305. The other skeletal components, other than the arm 403, may be defined by the input data defining the virtual skeleton 146B.

As can be appreciated, there are a number of ways to combine the input data and the model data used to generate the remapped skeleton 400. For example, input data defining hand and foot positions may be used to generate the remapped skeleton 400. At the same time, model data may be used to introduce a new position of one or more identified components to remove, resolve or mitigate the conflicts. The model data and the input data are combined in a manner that allows the input data to control the remapped skeleton 400 while also allowing the model data to remove, resolve or mitigate the conflicts.

Operation 507 may also include other techniques for generating a remapped skeleton. For example, model data may be used to generate a remapped skeleton to enhance or augment components of a virtual skeleton. Illustrative examples showing such enhancements and augmentations to a virtual skeleton are described in more detail below and shown in FIGS. 6, 7 and 10. In other examples of operation 507, the generation of a remapped skeleton may help mitigate issues with respect to distorted or incomplete virtual skeletons. Illustrative examples involving such scenarios are described in more detail below and shown in FIGS. 8 and 9.

Once a remapped skeleton is generated, the routine 500 continues at operation 509 where the skeletal processing module communicates the remapped skeleton to a consuming resource, such as an animation rig or a robotic controller. As can be appreciated, the consuming resource may include any software module that is capable of interpreting the remapped skeleton and transforming the remapped skeleton into graphical animations. In other examples, the consuming resource may also include a device configured to interpret and transform the remapped skeleton into physical movements, such as those of a robot or other device with moving parts. At the completion of operation 509, the routine 500 ends.

As summarized above, techniques disclosed herein may remap components of a virtual skeleton if a need for an enhancement, replacement or correction is identified. As described above and shown in FIGS. 3 and 4, one or more components of a virtual skeleton may be remapped if a conflict affects one or more components of a virtual skeleton.

In another example, as described below and shown in FIGS. 6, 7 and 10, one or more components of the virtual skeleton may also be remapped if enhancements, augmentations or special effects are desired. In yet another example, and as described below and shown in FIGS. 8 and 9, one or more components of a virtual skeleton may be remapped if the one or more components of the virtual skeleton are distorted, missing or incomplete.

Figure 7:
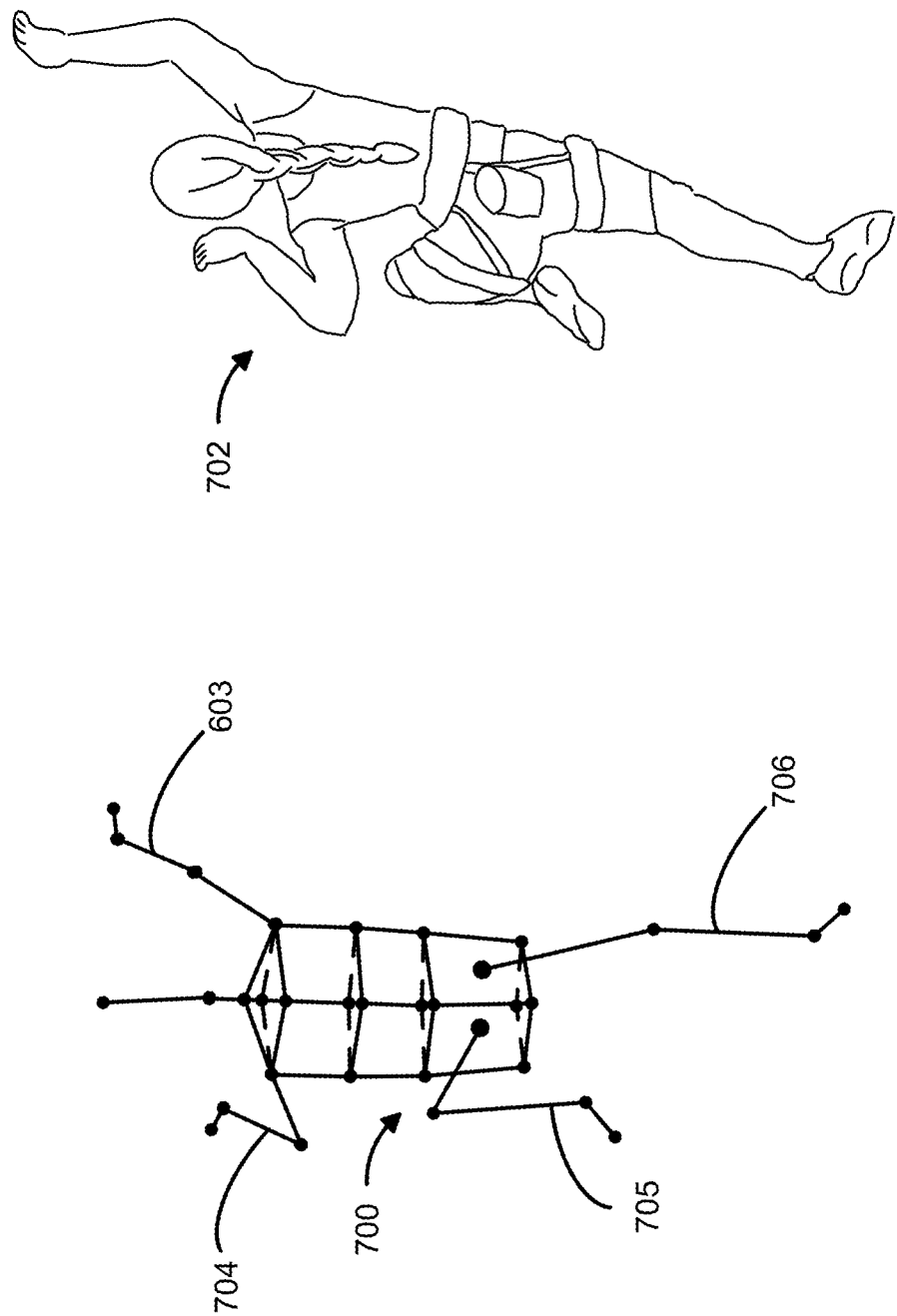
FIG. 7 is a pictorial diagram showing a remapped skeleton and an avatar that correspond to the virtual skeleton shown in FIG. 6.

FIGS. 6 and 7 provide an illustrative example of a virtual skeleton 146C that is enhanced with model data. By using techniques described herein, a software module or other application may be configured to identify components of the virtual skeleton 146C to be remapped. The identified components are then replaced, enhanced or augmented with modeled components to produce the remapped skeleton 700 that is more aligned with a scenario presented in a virtual environment. In this illustrative example, the body proportions, posture, position and other characteristics of the virtual skeleton 146C are used to generate a remapped skeleton 700, which may be more aligned with a specific scenario and/or virtual environment. For illustrative purposes, the example of FIGS. 6 and 7 are applied to routine 500 to show how components of a virtual skeleton 146C are processed in the generation of the remapped skeleton 700.

FIG. 6 shows an example of a virtual skeleton 146C that is directed by input data tracking the movement of the human target 132. As shown, the virtual skeleton 146C may be used to generate an avatar 602 showing body proportions and various positions of the human target 132. As applied to routine 500, at operation 501, input data representing the virtual skeleton 146C may be received by a gaming console.

Next, at operation 503, the skeletal processing module executing on the gaming console identifies one or more components of the virtual skeleton 146C to be remapped. As summarized above, components of a virtual skeleton may be identified using a number of techniques. For example, the skeletal processing module may be configured with a predetermined list of components of the virtual skeleton 146C to be remapped. In such an example, when a particular scene, such as a rock climbing scene, is presented, the skeletal processing module may identify certain components, such as the left arm 604, left leg 605 and the right leg 606 to be remapped, as the positions and/or other characteristics of such components may not be optimal for a particular scene. As shown, in FIG. 6, the leg positions of the avatar 602 may not be optimal for a rock climbing scene involving, for example, a dangling climber. Thus, a predetermined list of components or other configuration settings may identify such components to be identified during runtime.

In other techniques that apply to operation 503, the skeletal processing module may also utilize contextual information to identify one or more components to be remapped. For example, identification of one or more components of the virtual skeleton 146C may be based on contextual information describing a scenario, a state of a game, scenario or even a configuration setting in an application. In applying such techniques to the example involving the rock climber, the skeletal processing module may identify the left arm 604, the left leg 605 and the right leg 606 of the virtual skeleton 146C to be remapped because such components may conflict with objects in the virtual environment.

In another example, components of the virtual skeleton 146C may be identified to be remapped based on an interpretation of one or more characteristics of the virtual skeleton 146C. For instance, an interpretation of the posture, position and other characteristics of the virtual skeleton 146C may create a need for an enhancement or improvement. Such an implementation may improve the user experience of a game or application as some characteristics of a virtual skeleton 146C may not be optimal for providing a realistic user experience. For example, the stance of the avatar 602 may not be optimal for a rock climbing scene. In particular, the straightened legs of the avatar 602 may not be optimal for a game scenario where an avatar is dangling from a cliff.

When such contextual information is utilized, the skeletal processing module may analyze characteristics or positions of the virtual skeleton to determine if a component should be remapped. For example, the skeletal processing module may be configured with a rule where straight legs of the virtual avatar 146C should not be displayed in a scene where an avatar is hanging from a cliff. In another example, the skeletal processing module may identify components to be remapped if components of the virtual avatar 146C convey certain temperaments or characteristics, such as poor posture, a lazy stance, relaxed body language, slow movement, etc. In such an example, one or more components contributing to an identified temperament or characteristic may be identified to be remapped and enhanced.

Next, in applying operation 505 to the example of FIGS. 6 and 7, the skeletal processing module obtains model data. As described above, the model data may include pre-recorded data, which may include body proportions, movement characteristics, and other characteristics captured from professional athletes and/or other human models. In addition, and as summarized above, model data may be dynamically generated by the use of techniques disclosed herein. It can be appreciated that these examples are provided for illustrative purposes and should not be construed as limiting.

Next, in applying operation 507 to the present example, the skeletal processing module may generate the remapped skeleton 700 shown in FIG. 7. As summarized above, the generation of the remapped skeleton 700 may utilize a combination of the model data and the input data defining the virtual skeleton 146C. The remapped skeleton 700, for example, may be based on input data defining the user's arm position, e.g., the right arm 603. In addition, the remapped skeleton 700 may be based on the model data defining enhanced body proportions and/or an improved posture.

In a non-limiting example, components of the remapped skeleton 700, such as a modeled left arm 704, a modeled left leg 705 and a modeled right leg 706, may be based on the model data. As shown, the remapped skeleton 700 includes modeled components that convey a posture and other characteristics that may be based on a recording of a professional athlete or model. By using a combination of the input data defining the virtual skeleton 146C and the model data, the remapped skeleton 700 may include the enhanced characteristics while allowing the human target to provide control over one or more components.

Next, in applying operation 509 to the present example, the skeletal processing module communicates the remapped skeleton 700 to a consuming resource, such as an animation rig or a robotic controller. As summarized above, the consuming resource may include any software module that is capable of interpreting the remapped skeleton and transforming the remapped skeleton 700 into animation, such as the avatar 702 of FIG. 7.

As can be appreciated, an animation that is based on the remapped skeleton 700 may provide a user experience that is fitting to a game scenario, such as the rock climbing scenario of the present example. By using both the model data and the input data to generate the remapped skeleton 700, a human target may have real-time control of an animation having an enhanced appearance and form.

As shown in another illustrative example, techniques described herein may be used to generate a remapped skeleton to compensate for missing or distorted skeletal components. As described above, model data may be generated or obtained to replace or augment one or more components of a virtual skeleton. Such model data may be combined with input data defining the virtual skeleton in a manner that allows the remapped skeleton to follow the movements of the human target. The combination of model data and input data produces a remapped skeleton that does not show errors that may be produced by flawed input data. For illustrative purposes, the example shown in FIGS. 8 and 9 are applied to routine 500 to show how defects of a virtual skeleton 146D may be detected and corrected in the process of generating the remapped skeleton 900.

Figure 8:
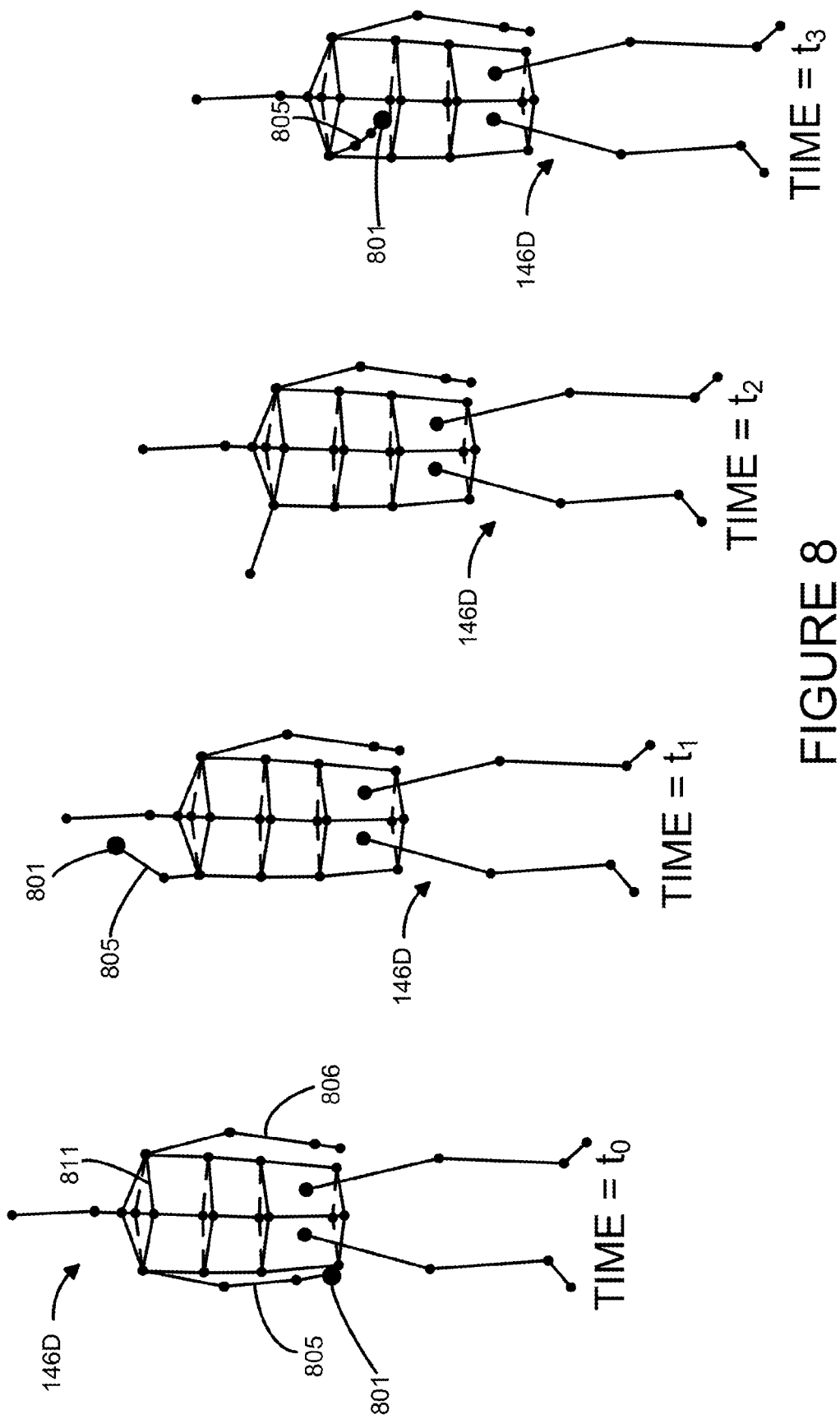
FIG. 8 is a pictorial diagram showing a virtual skeleton at different points in time.
Figure 9:
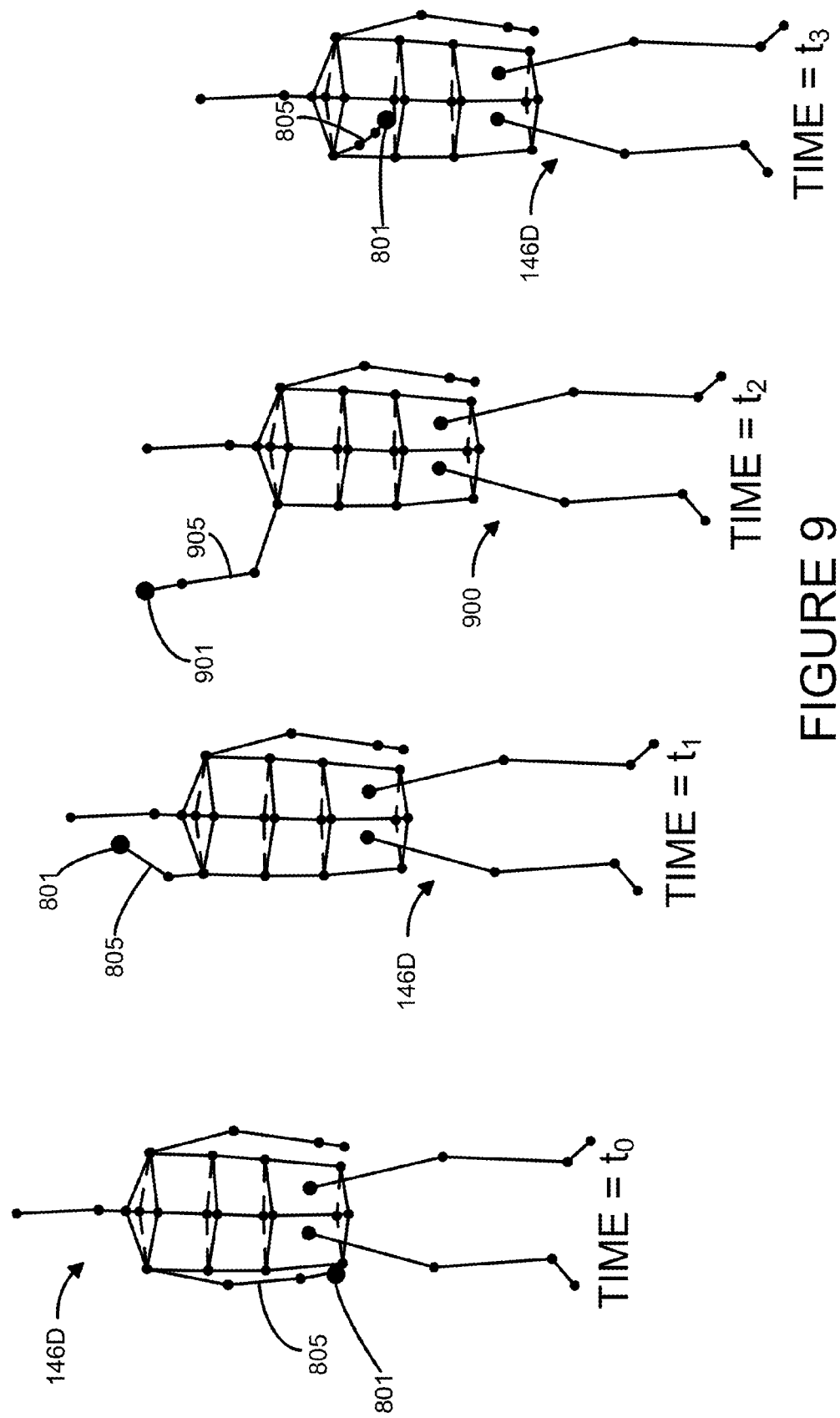
FIG. 9 is a pictorial diagram showing a remapped skeleton that is derived from the virtual skeleton shown in FIG. 8.

FIG. 8 provides an illustrative example of a virtual skeleton 146D having missing or distorted components. By using techniques described herein, a software module or other application may be configured to identify distorted, missing or incomplete components of the virtual skeleton 146D. The identified components are then replaced or corrected with modeled components to produce the remapped skeleton 900 of FIG. 9.

In applying operation 501 of routine 500 to the present example, FIG. 8 shows one form of input data that may be obtained by the skeletal processing module. In particular, FIG. 8 illustrates four frames of input data of a virtual skeleton 146D at four different times: $t_0$, $t_1$, $t_2$ and $t_3$. The frame at time $t_0$ shows the virtual skeleton 146D in a front-facing stance with the arms 805 and 806 to the side of the torso 811. Frames captured at times $t_1$, $t_2$ and $t_3$ show different stages of a throwing motion. The frames at times $t_1$, $t_2$ and $t_3$ respectfully show the right arm 805 and the right hand 801 in a windup position ($t_1$); the forward throwing motion ($t_2$); and the follow through ($t_3$). As shown, the frame illustrating the forward throwing motion, at time $t_2$, shows that the right arm 805 and the right hand 801 are missing.

As can be appreciated, missing components may be caused by high-velocity movements that may be performed by the human target. As some cameras may not have the capabilities required to capture an image of a high-velocity movement, certain frames of the input data may have missing or distorted components such as the sample shown at time $t_2$ in FIG. 8. To address such issues, the skeletal processing module may be configured to identify the need to remap components of the virtual skeleton if one or more components is missing or distorted. For instance, in applying the present example to operation 503, the right arm 805 and the right hand 801 may be identified for remapping since the components are missing from one or more frames of the input data.

In another example of operation 503, the skeletal processing module may be configured to automatically identify the need to remap one or more components of the virtual skeleton if the one or more components is out of proportion or if a component is otherwise unrecognizable. For example, a virtual skeleton may show a component, such as an arm, that has a different length in one frame versus a length shown in previous frames. The skeletal processing module may be configured to compare one frame to a reference frame, such as the frame at time $t_0$, to detect discrepancies within the virtual skeleton. As can be appreciated, such techniques may be used to identify a need to remap components of the virtual skeleton.

In applying operation 505 of routine 500 to the present example, parameters defining components of the virtual skeleton 146D may be used to generate model data. As shown, a reference frame, such as the frame at time $t_0$ of FIG. 8, may be used for measuring components of the virtual skeleton 146D. Thus, when other frames, such as the frame at time $t_2$, are missing components or include a component that is out of proportion, the measurements from the reference frame may be stored as model data, which may be used to correct or replace missing components of the virtual skeleton 146D.

Measurements from reference frames may also include movement data, contextual data, and other data regarding the characteristics of the virtual skeleton 146D. For instance, the speed of the player's arm 805 and hand 801 may be calculated by using distance and time parameters from the frames that are provided before and/or after the frames with the missing or distorted components. In this example, the frames at time $t_1$ and time $t_3$ may be used to calculate or project the velocity, position, size and other parameters of the arm 805 and hand 801, which may be stored as model data.

In applying operation 507 to the present example, the model data is then used to generate a modeled component of the remapped skeleton 900 shown in FIG. 9. As shown, the missing components in the frame at time $t_2$ of FIG. 8 are filled with a modeled arm 905 and a modeled hand 901 of the remapped skeleton 900 shown in FIG. 9. As can be appreciated, the use of model data to fill in for missing components allows the human target 132 to maintain real-time control of the skeletal data without displaying the graphical defects that may be caused by the missing or distorted input data.

Figure 10:
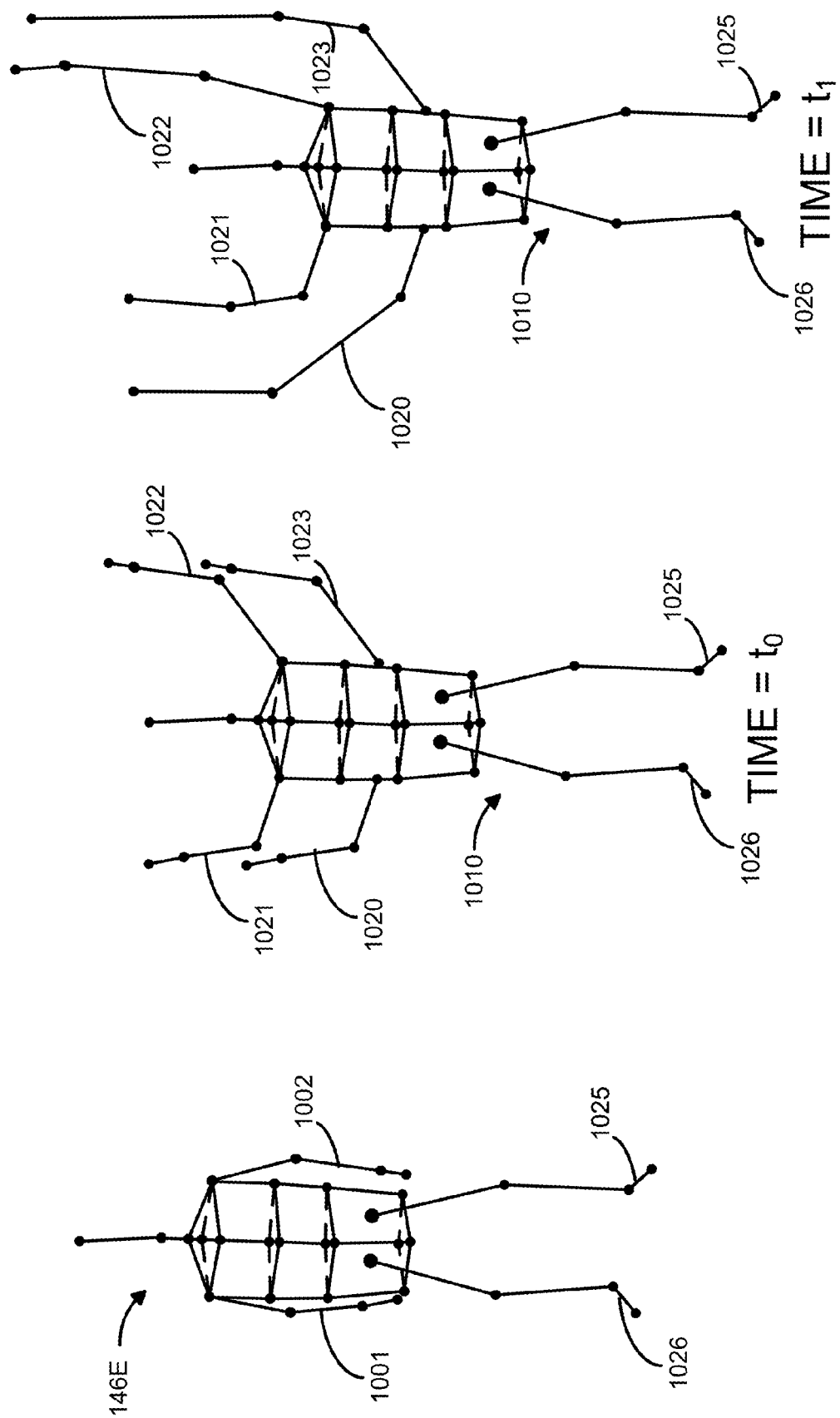
FIG. 10 is a pictorial diagram showing a virtual skeleton and a remapped skeleton defining special movement characteristics.

As summarized above, FIG. 10 provides an illustrative example of a virtual skeleton 146E that may be enhanced with customized model data defining fictional properties. By using techniques described herein, a software module or other application may be configured to identify components of the virtual skeleton 146E to be remapped. The identified components are then replaced, enhanced or augmented with modeled components to produce the remapped skeleton 1010.

As summarized above, model data may be designed to define fictional skeletal components that may have fabricated properties. When such model data is utilized to generate a remapped skeleton, the resulting output, such as the remapped skeleton 1010, may be applied to an animation rig to create an augmented virtual being that may be controlled by the human target. For example, as shown in FIG. 10, the remapped skeleton 1010 may define a being having four arms, with augmented properties, such as super-human jumping or stretching.

As shown in FIG. 10, two frames of input data are provided, one at time $t_0$ and the other at time $t_1$. At time $t_0$ the arms (1020-1023) of the remapped skeleton 1010 may have a first length, but at time $t_1$, the arms (1020-1023) may have an extended length. As can be appreciate these examples are provided for illustrative purposes, and are not to be construed as limiting. Implementations of the techniques described herein may produce a remapped skeleton that may define many forms of output having many special movement characteristics and esthetic features.

In such an embodiment, the customized model data may be combined with input data in a manner as described above. For instance, the arm (1001 and 1002) and foot (1025 and 1026) components of the virtual skeleton 146E, which is defined by input data, may be used to control arm (1020-1023) and foot (1025 and 1026) components of the remapped skeleton 1010. At the same time, the customized model data provides other parameters defining other modified components, such as extended arms, additional arms, arms with four joints, etc. Gestures performed by the human target may also be interpreted by the skeletal processing module to control fictional movements or hyper-real actions of the remapped skeleton 1010. Such an implementation translates a user's actions into fantastical versions of movement for an avatar to perform, such as super human stretching, etc.

Figure 11:
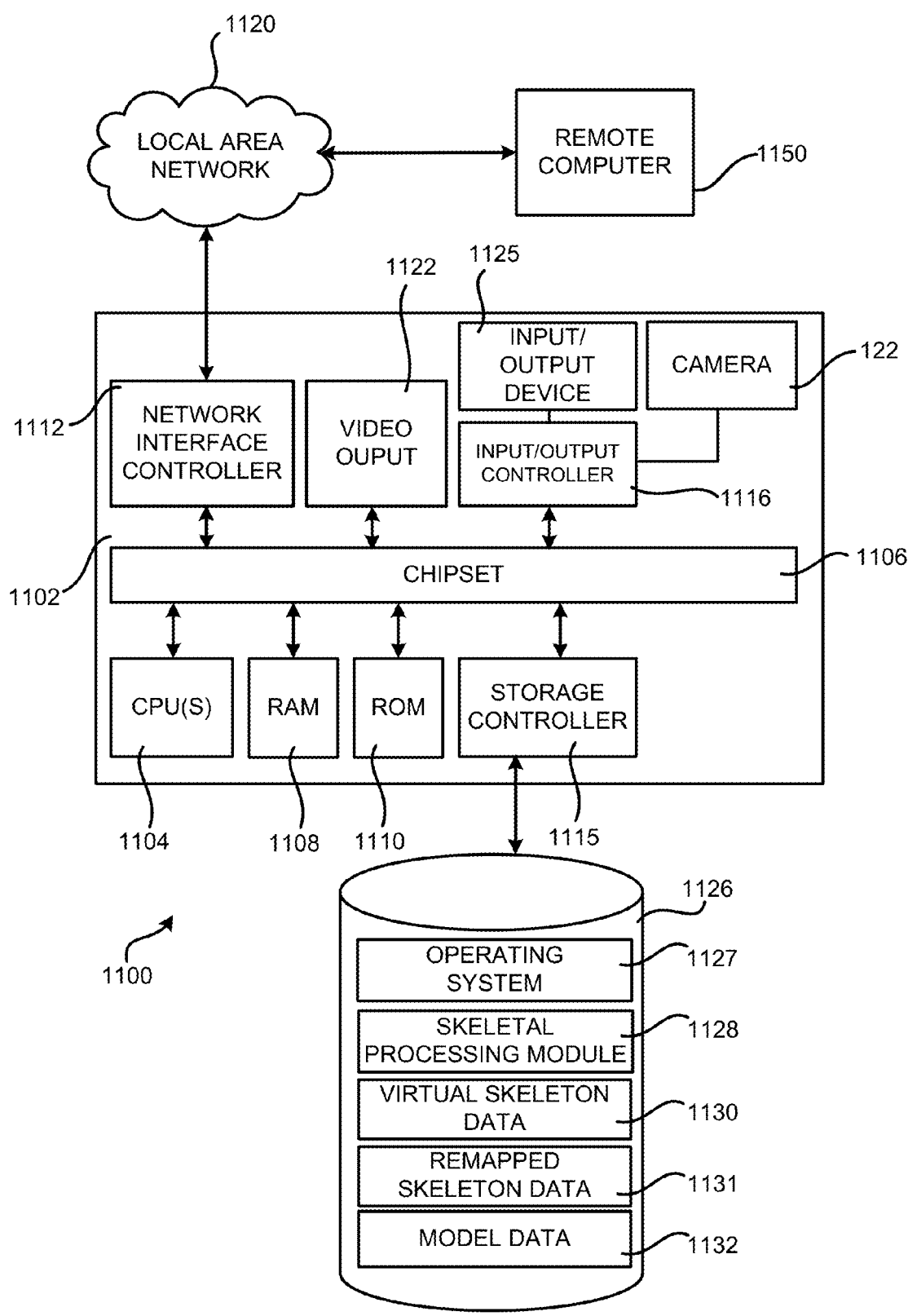
FIG. 11 is a computer architecture diagram showing an illustrative computer hardware and software architecture for a computing system capable of implementing aspects of the technologies presented herein.

FIG. 11 shows an example computer architecture capable of executing the program components described above for dynamically remapping select components of a virtual skeleton. The computer architecture shown in FIG. 11 illustrates the components of a computing device 1100, which may be embodied in a game console, such as the gaming system 112 shown in FIG. 1, conventional server computer, workstation, desktop computer, laptop, tablet, phablet, network appliance, personal digital assistant ("PDA"), e-reader, digital cellular phone, or other computing device, and may be utilized to implement a computer configured execute any of the software components presented herein. For example, the computer architecture shown in FIG. 11 may be utilized to execute any of the software components described above.

The computing device 1100 includes a baseboard 1102, or "motherboard," which is a printed circuit board to which a multitude of components or devices may be connected by way of a system bus or other electrical communication paths. In one illustrative embodiment, one or more central processing units ("CPUs") 1104 operate in conjunction with a chipset 1106. The CPUs 1104 may be standard programmable processors that perform arithmetic and logical operations necessary for the operation of the computing device 1100.

The CPUs 1104 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 1104 and the remainder of the components and devices on the baseboard 1102. The chipset 1106 may provide an interface to a RAM 1108, used as the main memory in the computing device 1100. The chipset 1106 may further provide an interface to a computer-readable storage medium such as a read-only memory ("ROM") 1110 or non-volatile RAM ("NVRAM") for storing basic routines that help to startup the computing device 1100 and to transfer information between the various components and devices. The ROM 1110 or NVRAM may also store other software components necessary for the operation of the computing device 1100 in accordance with the embodiments described herein.

The computing device 1100 may operate in a networked environment using logical connections to remote computing devices and computer systems through a network, such as the local area network 1120. The chipset 1106 may include functionality for providing network connectivity through a network interface controller (NIC) 1112, such as a gigabit Ethernet adapter. The NIC 1112 is capable of connecting the computing device 1100 to other computing devices over the network 1120. It should be appreciated that multiple NICs 1112 may be present in the computing device 1100, connecting the computer to other types of networks and remote computer systems. The local area network 1120 allows the computing device 1100 to communicate with remote services and servers, such as the remote computer 1150. As can be appreciated, the remote computer 1150 may host a number of services such as XBOX LIVE gaming service provided by MICROSOFT CORPORATION of Redmond, Wash.

The computing device 1100 may be connected to a mass storage device 1126 that provides non-volatile storage for the computing device. The mass storage device 1126 may store system programs, application programs, other program modules, and data, which have been described in greater detail herein. The mass storage device 1126 may be connected to the computing device 1100 through a storage controller 1115 connected to the chipset 1106. The mass storage device 1126 may consist of one or more physical storage units. The storage controller 1115 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 1126, other storage media and the storage controller 1115 may include MultiMediaCard (MMC) components, eMMC components, Secure Digital (SD) components, PCI Express components, or the like.

The computing device 1100 may store data on the mass storage device 1126 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1126 is characterized as primary or secondary storage, and the like.

For example, the computing device 1100 may store information to the mass storage device 1126 by issuing instructions through the storage controller 1115 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may further read information from the mass storage device 1126 by detecting the physical states or characteristics of one or more particular locations within the physical storage units.

In addition to the mass storage device 1126 described above, the computing device 1100 may have access to other computer-readable media to store and retrieve information, such as program modules, data structures, or other data. Thus, although the skeletal processing module 1128 and other data modules are depicted as data and software stored in the mass storage device 1126, it should be appreciated that these components and/or other modules may be stored, at least in part, in other computer-readable storage media of the computing device 1100. It can be appreciated that the skeletal processing module 1128 may also manage other functions described herein. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computing device 1100.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 1100. For purposes of the claims, the phrase "computer storage medium," and variations thereof, does not include waves or signals per se and/or communication media.

The mass storage device 1126 may store an operating system 1127 utilized to control the operation of the computing device 1100. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems.

It should be appreciated that other operating systems may also be utilized. The mass storage device 1126 may store other system or application programs and data utilized by the computing device 1100, such as the virtual skeleton data 1130, the remapped skeleton data 1131, the model data 1132 and/or any of the other software components and data described above. For illustrative purposes, the virtual skeleton data 1130 may include input data modeling a virtual skeleton. In addition, for illustrative purposes, the remapped skeleton data 1131 may include data defining a remapped skeleton generated by techniques disclosed herein. The mass storage device 1126 might also store other programs and data not specifically identified herein.

In one embodiment, the mass storage device 1126 or other computer-readable storage media is encoded with computer-executable instructions which, when loaded into the computing device 1100, transform the computer from a general-purpose computing system into a special-purpose computer capable of implementing the embodiments described herein. These computer-executable instructions transform the computing device 1100 by specifying how the CPUs 1104 transition between states, as described above. According to one embodiment, the computing device 1100 has access to computer-readable storage media storing computer-executable instructions which, when executed by the computing device 1100, perform the various routines described above with regard to FIG. 5 and the other figures. The computing device 1100 might also include computer-readable storage media for performing any of the other computer-implemented operations described herein.

The computing device 1100 may also include one or more input/output controllers 1116 for receiving and processing input from a number of input devices, such as a keyboard, a mouse, a microphone, a headset, a touchpad, a touch screen, an electronic stylus, or any other type of input device. Also shown, the input/output controller 1116 is in communication with an input/output device 1125. The input/output controller 1116 may provide output to a display, such as a computer monitor, a flat-panel display, a digital projector, a printer, a plotter, or other type of output device. The input/output controller 1116 may provide input communication with other devices such as the camera 122, game controllers and/or audio devices. In addition, or alternatively, a video output 1122 may be in communication with the chipset 1106 and operate independent of the input/output controllers 1116. It will be appreciated that the computing device 1100 may not include all of the components shown in FIG. 11, may include other components that are not explicitly shown in FIG. 11, or may utilize an architecture completely different than that shown in FIG. 11.

The disclosure presented herein may be considered in view of the following clauses.

Clause 1: A computer-implemented method for processing data defining a virtual skeleton, the computer-implemented method comprising: identifying, at a computing device, a component of the virtual skeleton to be remapped; obtaining, at the computing device, model data defining at least one modeled component; and generating, at the computing device, a remapped virtual skeleton based on, at least in part, the data defining the virtual skeleton, wherein at least one component of the remapped skeleton is based on the model data defining the at least one modeled component.

Clause 2: The computer-implemented method of clause 1, wherein identifying the component of the virtual skeleton is based on a conflict between the component and a virtual object.

Clause 3: The computer-implemented method of clauses 1 and 2, wherein identifying the component of the virtual skeleton comprises: determining a location of the component; determining a location of a virtual object; determining if the location of the component is in conflict with the location of the virtual object; and identifying the component of the virtual skeleton to be remapped if the location of the component is in conflict with the location of the virtual object.

Clause 4: The computer-implemented method of clauses 1-3, wherein obtaining the model data comprises: determining a new location for the component, wherein the new location is not in conflict with the location of the virtual object; and generating the model data defining the at least one modeled component, wherein the location of the at least one modeled component is based on the new location.

Clause 5: The computer-implemented method of clauses 1-4, wherein identifying the component of the virtual skeleton comprises: determining a first measurement of the component in a first frame of the input data; determining a second measurement of the component in a second frame of the input data; determining a presence of an inconsistency between the first measurement and the second measurement; and identifying the component of the virtual skeleton to be remapped if the inconsistency between the first measurement and the second measurement is present.

Clause 6: The computer-implemented method of clauses 1-5, wherein obtaining the model data comprises: determining a parameter defining a size of the component in a reference frame of the input data; and configuring a size of the at least one modeled component based on the parameter defining the size of the component.

Clause 7: The computer-implemented method of clauses 1-6, wherein obtaining the model data comprises accessing pre-recorded data defining a skeletal model, wherein at least one component of the remapped skeleton is based on the pre-recorded data defining the skeletal model, wherein the data defining the virtual skeleton identifies a position of the component, and wherein the remapped skeleton is configured to enable the data defining the virtual skeleton to control a position of at least one component of the remapped skeleton using the position of the component.

Clause 8: A computer storage medium having computer-executable instructions stored thereupon which, when executed by a computing device, cause the computing device to: obtain input data defining a virtual skeleton; identify a component of the virtual skeleton to be remapped; obtain model data defining at least one modeled component; and generate a remapped virtual skeleton based on, at least in part, the data defining the virtual skeleton, wherein at least one component of the remapped skeleton is based on the model data defining the at least one modeled component.

Clause 9: The computer storage medium of clause 8, wherein identifying the component of the virtual skeleton is based on a conflict between the component and a virtual object.

Clause 10: The computer storage medium of clauses 8-9, wherein identifying the component of the virtual skeleton comprises: determining a location of the component; determining a location of a virtual object; determining if the location of the component is in conflict with the location of the virtual object; and identifying the component of the virtual skeleton to be remapped if the location of the component is in conflict with the location of the virtual object.

Clause 11: The computer storage medium of clauses 8-10, wherein obtaining the model data comprises: determining a new location for the component, wherein the new location is not in conflict with the location of the virtual object; and generating the model data defining the at least one modeled component, wherein the location of the at least one modeled component is based on the new location.

Clause 12: The computer storage medium of clauses 8-11, wherein identifying the component of the virtual skeleton comprises: determining a first measurement of the component in a first frame of the input data; determining a second measurement of the component in a second frame of the input data; determining a presence of an inconsistency between the first measurement and the second measurement; and identifying the component of the virtual skeleton to be remapped if the inconsistency between the first measurement and the second measurement is present.

Clause 13: The computer storage medium of clauses 8-12, wherein obtaining the model data comprises: determining a parameter defining a size of the component in a reference frame of the input data; and configuring a size of the at least one modeled component based on the parameter defining the size of the component.

Clause 14: The computer storage medium of clauses 8-13, wherein obtaining the model data comprises accessing pre-recorded data defining a skeletal model, wherein at least one component of the remapped skeleton is based on the pre-recorded data defining the skeletal model, wherein the data defining the virtual skeleton identifies a position of the component, and wherein the remapped skeleton is configured to enable the data defining the virtual skeleton to control a position of at least one component of the remapped skeleton using the position of the component.

Clause 15: A computing device, comprising: a processor; and a memory having computer-executable instructions stored thereupon which, when executed by the processor, cause the computing device to obtain input data defining a virtual skeleton, wherein the virtual skeleton comprises a plurality of connections and a plurality of joints, wherein individual joints of the plurality of joints are configured between individual connections of the plurality of connections, identify a need to enhance or replace a subset of the individual joints and the individual connections, obtain model data defining at least one modeled joint and at least one modeled connection, and generate a remapped virtual skeleton based, at least in part, on the at least one modeled joint and the at least one modeled connection, wherein the at least one modeled joint and the at least one modeled connection enhances or replaces the subset of the individual joints and the individual connections in the virtual skeleton.

Clause 16: The computing device of clause 15, wherein the need to enhance or replace the subset of the individual joints and the individual connections is based on an interpretation of one or more characteristics of the virtual skeleton.

Clause 17: The computing device of clauses 15-16, wherein the need to enhance or replace the subset of the individual joints and the individual connections is based on a presence of a conflict between at least one individual connection of the virtual skeleton and a virtual object.

Clause 18: The computing device of clauses 15-17, wherein the input data defining the virtual skeleton identifies a position of at least one individual connection of the virtual skeleton and wherein a position of at least one individual connection of the remapped skeleton is based on a position of the at least one individual connection of the virtual skeleton.

Clause 19: The computing device of clauses 15-18, wherein identifying the need to enhance or replace the subset of the individual joints and the individual connections comprises: determining a position of at least one individual connection of the virtual skeleton; determining a position of a virtual object; determining if the position of the at least one individual connection of the virtual skeleton is in conflict with the position of the virtual object; and selecting the at least one individual connection of the virtual skeleton to be part of the subset of the individual joints and the individual connections if the position of the at least one individual connection of the virtual skeleton is in conflict with the position of the virtual object.

Clause 20: The computing device of clauses 15-19, wherein obtaining the model data comprises: determining a new position of the at least one individual connection of the virtual skeleton, wherein the new position of the at least one individual connection of the virtual skeleton is not in conflict with the position of the virtual object; and configuring the model data to include a position of the at least one modeled connection based on the new position the at least one individual connection of the virtual skeleton.

Based on the foregoing, it should be appreciated that technologies for dynamically remapping select components of a virtual skeleton are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for processing input data defining a virtual skeleton, the computer-implemented method comprising:
   identifying, at a computing device, a component of the virtual skeleton to be remapped, the identifying comprising:
      determining a first measurement of the component of the virtual skeleton in a first frame of the input data defining the virtual skeleton,
      determining a second measurement of the component of the virtual skeleton in a second frame of the input data defining the virtual skeleton,
      determining a presence of an inconsistency between the first measurement and the second measurement, and
      identifying the component of the virtual skeleton to be remapped if the inconsistency between the first measurement and the second measurement is present;
   obtaining, at the computing device, model data defining at least one modeled component; and
   generating, at the computing device, a remapped virtual skeleton based, at least in part, on the input data defining the virtual skeleton, wherein at least one component of the remapped virtual skeleton is based on the model data defining the at least one modeled component.

2. The computer-implemented method of claim 1, further comprising identifying, at the computing device, at least one component of the virtual skeleton to be remapped based on a conflict between the at least one component and a virtual object.

3. The computer-implemented method of claim 1, further comprising identifying, at the computing device, at least one component of the virtual skeleton to be remapped, the identifying the at least one component comprising:
   determining a location of the at least one component;
   determining a location of a virtual object;
   determining if the location of the at least one component is in conflict with the location of the virtual object; and
   identifying the at least one component of the virtual skeleton to be remapped if the location of the at least one component is in conflict with the location of the virtual object.

4. The computer-implemented method of claim 3, wherein the obtaining the model data further comprises:
   determining a new location for the at least one component, wherein the new location is not in conflict with the location of the virtual object; and
   generating the model data defining the at least one modeled component, wherein a location of the at least one modeled component is based on the new location.

5. The computer-implemented method of claim 1, wherein the obtaining the model data comprises:
   determining a parameter defining a size of the component in a reference frame of the input data defining the virtual skeleton; and
   configuring a size of the at least one modeled component based on the parameter defining the size of the component.

6. The computer-implemented method of claim 1, wherein the obtaining the model data comprises accessing pre-recorded data defining a skeletal model, wherein the at least one component of the remapped virtual skeleton is further based on the pre-recorded data defining the skeletal model, wherein the input data defining the virtual skeleton identifies a position of the component, and wherein the remapped virtual skeleton is configured to enable the input data defining the virtual skeleton to control a position of the at least one component of the remapped virtual skeleton using the position of the component.

7. One of a solid state storage device, an optical disk or a magnetic storage device having computer-executable instructions stored thereupon which, when executed by a computing device, cause the computing device to:
   obtain input data defining a virtual skeleton;
   identify a component of the virtual skeleton to be remapped, the identifying comprising:
      determining a first measurement of the component in a first frame of the input data defining the virtual skeleton,
      determining a second measurement of the component in a second frame of the input data defining the virtual skeleton,
      determining a presence of an inconsistency between the first measurement and the second measurement, and
      identifying the component of the virtual skeleton to be remapped if the inconsistency between the first measurement and the second measurement is present;
   obtain model data defining at least one modeled component; and
   generate a remapped virtual skeleton based, at least in part, on the input data defining the virtual skeleton, wherein at least one component of the remapped virtual skeleton is based on the model data defining the at least one modeled component.

8. The solid state storage device, optical disk or magnetic storage device of claim 7, wherein the computer-executable instructions, when executed by the computing device, further cause the computing device to identify at least one component of the virtual skeleton to be remapped based on a conflict between the at least one component and a virtual object.

9. The solid state storage device, optical disk or magnetic storage device of claim 7, wherein the computer-executable instructions, when executed by the computing device, further cause the computing device to identify at least one component of the virtual skeleton to be remapped, the identifying the at least one component comprising:
  determining a location of the at least one component;
  determining a location of a virtual object;
  determining if the location of the at least one component is in conflict with the location of the virtual object; and
  identifying the at least one component of the virtual skeleton to be remapped if the location of the at least one component is in conflict with the location of the virtual object.

10. The solid state storage device, optical disk or magnetic storage device of claim 9, wherein the obtaining the model data further comprises:
  determining a new location for the at least one component, wherein the new location is not in conflict with the location of the virtual object; and
  generating the model data defining the at least one modeled component, wherein a location of the at least one modeled component is based on the new location.

11. The solid state storage device, optical disk or magnetic storage device of claim 7, wherein the obtaining the model data comprises:
  determining a parameter defining a size of the component in a reference frame of the input data defining the virtual skeleton; and
  configuring a size of the at least one modeled component based on the parameter defining the size of the component.

12. The solid state storage device, optical disk or magnetic storage device of claim 7, wherein the obtaining the model data comprises accessing pre-recorded data defining a skeletal model, wherein the at least one component of the remapped virtual skeleton is further based on the pre-recorded data defining the skeletal model, wherein the input data defining the virtual skeleton identifies a position of the component, and wherein the remapped virtual skeleton is configured to enable the input data defining the virtual skeleton to control a position of the at least one component of the remapped virtual skeleton using the position of the component.

13. A computing device, comprising:
  a processor; and
  a memory having computer-executable instructions stored thereupon which, when executed by the processor, cause the computing device to:
    obtain input data defining a virtual skeleton, wherein the virtual skeleton comprises a plurality of connections and a plurality of joints, wherein individual joints of the plurality of joints are configured between individual connections of the plurality of connections;
    identify a need to enhance or replace a subset of the individual joints and the individual connections, the identifying comprising:
      determining a first measurement of the subset of the individual joints and the individual connections in a first frame of the input data defining the virtual skeleton,
      determining a second measurement of the subset of the individual joints and the individual connections in a second frame of the input data defining the virtual skeleton,
      determining a presence of an inconsistency between the first measurement and the second measurement, and
      identifying the need to enhance or replace the subset of the individual joints and the individual connections if the inconsistency between the first measurement and the second measurement is present;
    obtain model data defining at least one modeled joint and at least one modeled connection; and
    generate a remapped virtual skeleton based, at least in part, on the at least one modeled joint and the at least one modeled connection, wherein the at least one modeled joint and the at least one modeled connection enhances or replaces the subset of the individual joints and the individual connections in the virtual skeleton.

14. The computing device of claim 13, wherein the need to enhance or replace the subset of the individual joints and the individual connections is further based on an interpretation of one or more characteristics of the virtual skeleton.

15. The computing device of claim 13, wherein the computer-executable instructions, when executed by the processor, further cause the computing device to identify a need to enhance or replace at least one subset of the individual joints and the individual connections based on a presence of a conflict between at least one individual connection of the virtual skeleton and a virtual object.

16. The computing device of claim 13, wherein the input data defining the virtual skeleton identifies a position of at least one individual connection of the virtual skeleton and wherein a position of at least one individual connection of the remapped virtual skeleton is based on the position of the at least one individual connection of the virtual skeleton.

17. The computing device of claim 13, wherein the computer-executable instructions, when executed by the processor, further cause the computing device to identify a need to enhance or replace at least one subset of the individual joints and the individual connections, the identifying the need to enhance or replace the at least one subset comprising:
  determining a position of at least one individual connection of the virtual skeleton;
  determining a position of a virtual object;
  determining if the position of the at least one individual connection of the virtual skeleton is in conflict with the position of the virtual object; and
  selecting the at least one individual connection of the virtual skeleton to be part of the at least one subset of the individual joints and the individual connections if the position of the at least one individual connection of the virtual skeleton is in conflict with the position of the virtual object.

18. The computing device of claim 17, wherein the obtaining the model data comprises:
  determining a new position of the at least one individual connection of the virtual skeleton, wherein the new position of the at least one individual connection of the virtual skeleton is not in conflict with the position of the virtual object; and configuring the model data to include a position of the at least one modeled connection based on the new position of the at least one individual connection of the virtual skeleton.

\* \* \* \* \*